(12) United States Patent
Sueoka et al.

(10) Patent No.: US 10,415,441 B2
(45) Date of Patent: Sep. 17, 2019

(54) GROUNDING STRUCTURE FOR INTERNAL COMBUSTION ENGINE

(71) Applicant: ISUZU MOTORS LIMITED, Shinagawa-ku, Tokyo (JP)

(72) Inventors: Daisuke Sueoka, Fuchu (JP); Naoki Mizukami, Atsugi (JP); Takaya Maeda, Yokohama (JP); Tsutomu Matsunaga, Ayase (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/775,355

(22) PCT Filed: Nov. 9, 2016

(86) PCT No.: PCT/JP2016/083206
§ 371 (c)(1),
(2) Date: May 10, 2018

(87) PCT Pub. No.: WO2017/082285
PCT Pub. Date: May 18, 2017

(65) Prior Publication Data
US 2018/0334935 A1 Nov. 22, 2018

(30) Foreign Application Priority Data
Nov. 12, 2015 (JP) .................. 2015-222130

(51) Int. Cl.
*F01M 11/10* (2006.01)
*F01M 1/20* (2006.01)
(Continued)

(52) U.S. Cl.
CPC ............... *F01M 1/20* (2013.01); *B60R 16/02* (2013.01); *F01M 11/0004* (2013.01);
(Continued)

(58) Field of Classification Search
CPC ....... F01M 1/20; F01M 11/0004; F02B 77/00; F02B 77/08; F16B 33/004; B60R 16/02
See application file for complete search history.

(56) References Cited

U.S. PATENT DOCUMENTS 4,175,223 A * 11/1979 Lauritsen ............... H01H 13/02
200/16 C
4,874,923 A * 10/1989 Hatanaka ................ F23Q 7/001
219/270
(Continued)

FOREIGN PATENT DOCUMENTS

CN 204113376 U 1/2015
DE 19742458 C1 11/1998
(Continued)

OTHER PUBLICATIONS

International Search Report and Written Opinion for related PCT Application No. PCT/JP2016/083206 dated Feb. 7, 2017; 11 pages.
(Continued)

*Primary Examiner* — Thomas N Moulis
(74) *Attorney, Agent, or Firm* — Procopio, Cory, Hargreaves & Savitch LLP

(57) ABSTRACT

Provided is a grounding structure for an internal combustion engine, including a resinous body 2 configured to be fastened to an engine body 7 via a bolt 8, an electric component 5 attached to the body 2, and a conductive member 16 provided to electrically connect the electric component 5 to the bolt 8 in order to ground the electric component 5 to the engine body 7.

8 Claims, 4 Drawing Sheets

(51) Int. Cl.
  *B60R 16/02* (2006.01)
  *F02B 77/00* (2006.01)
  *H01R 4/64* (2006.01)
  *F01M 11/00* (2006.01)
  *F02B 77/08* (2006.01)
  *F02F 7/00* (2006.01)
  *F16B 33/00* (2006.01)

(52) U.S. Cl.
  CPC ............ *F01M 11/10* (2013.01); *F02B 77/00* (2013.01); *F02B 77/08* (2013.01); *F02F 7/0085* (2013.01); *F16B 33/004* (2013.01); *H01R 4/64* (2013.01); *F01M 2011/0029* (2013.01)

(56) References Cited

U.S. PATENT DOCUMENTS

| | | | |
|---|---|---|---|
| 4,962,285 A * | 10/1990 | Baker | E04H 4/144 |
| | | | 174/6 |
| 5,057,813 A | 10/1991 | Sasaki et al. | |
| 5,741,143 A * | 4/1998 | Hotea | G01D 11/245 |
| | | | 439/86 |
| 6,188,019 B1 | 2/2001 | Baur et al. | |
| 10,036,315 B2 * | 7/2018 | Osawa | F16H 59/68 |
| 2006/0005809 A1 * | 1/2006 | Kado | F02D 9/1035 |
| | | | 123/399 |
| 2007/0247143 A1 * | 10/2007 | Ikeda | F02D 9/105 |
| | | | 324/207.25 |
| 2014/0116931 A1 * | 5/2014 | Beer | F01M 11/0004 |
| | | | 210/196 |
| 2015/0059584 A1 * | 3/2015 | Steins | B01D 46/0005 |
| | | | 96/417 |
| 2016/0363204 A1 * | 12/2016 | Paielli | F16H 48/34 |
| 2018/0022497 A1 * | 1/2018 | Fasold | B65D 1/42 |
| | | | 220/200 |
| 2018/0302998 A1 * | 10/2018 | Albert | H05K 5/0082 |
| 2018/0334935 A1 * | 11/2018 | Sueoka | B60R 16/02 |

FOREIGN PATENT DOCUMENTS

| | | |
|---|---|---|
| EP | 2409880 A1 | 1/2012 |
| JP | H02-310427 A | 12/1990 |
| JP | H06-019771 Y2 | 5/1994 |
| JP | H10-302592 A | 11/1998 |
| JP | 2001-271623 A | 10/2001 |
| JP | 3415742 B2 | 6/2003 |
| JP | 2008-303811 A | 12/2008 |
| JP | 2012-246887 A | 12/2012 |
| JP | 2012-246888 A | 12/2012 |
| JP | 2016-024920 A | 2/2016 |

OTHER PUBLICATIONS

Extended European Search Report for related EP App No. 16864246.0 dated Jun. 3, 2019, 5 pgs.

* cited by examiner

[FIG. 1]
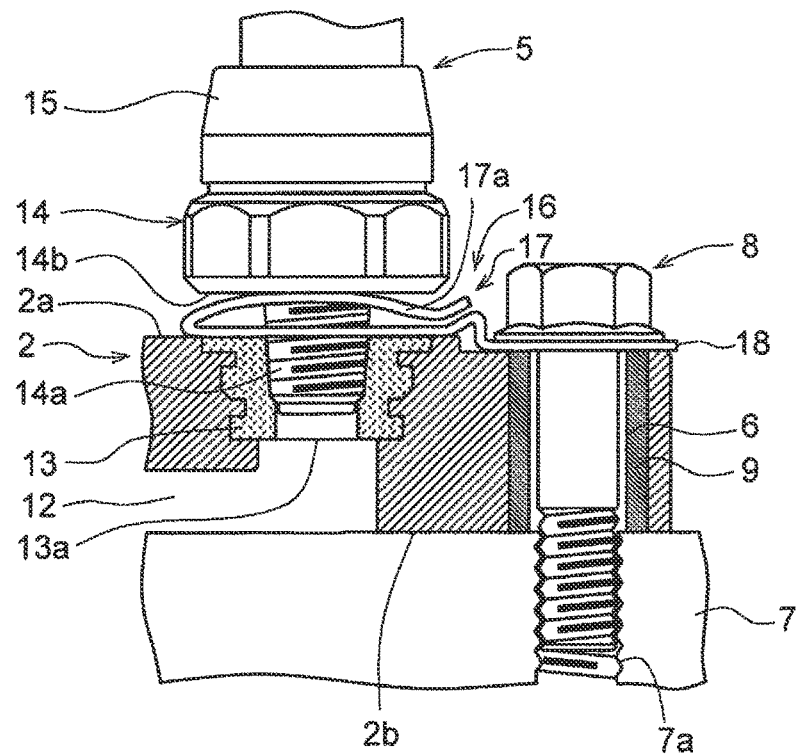
[FIG. 2]
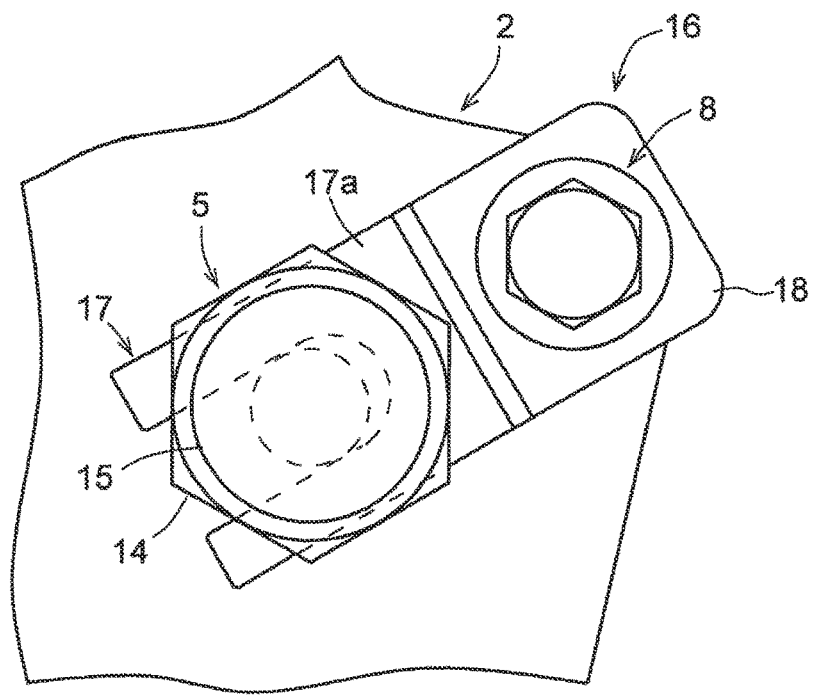

[FIG. 3]
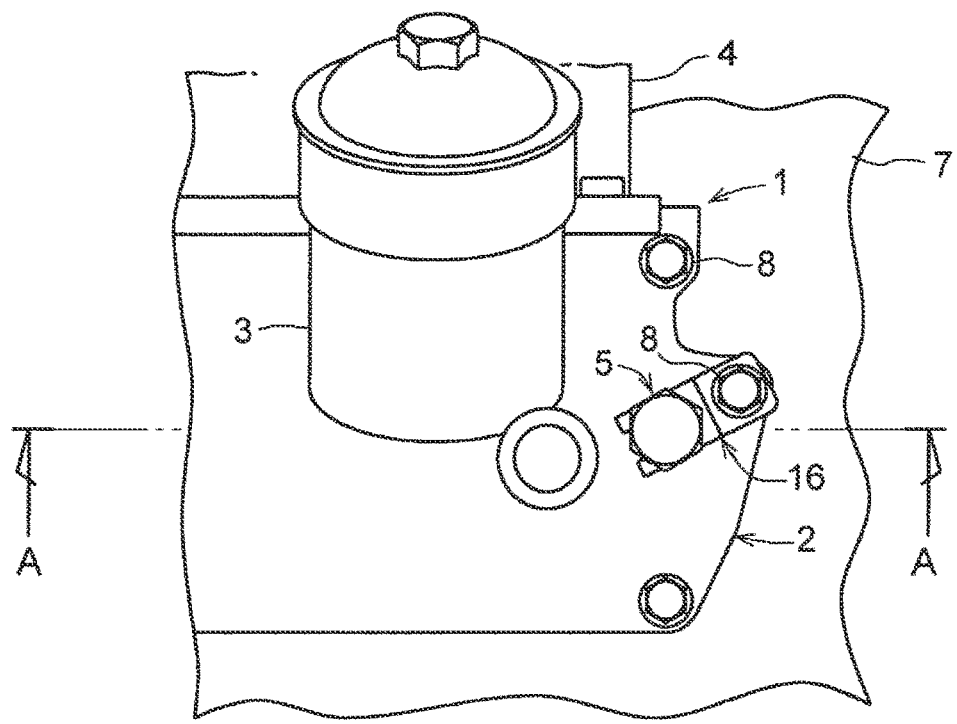
[FIG. 4]
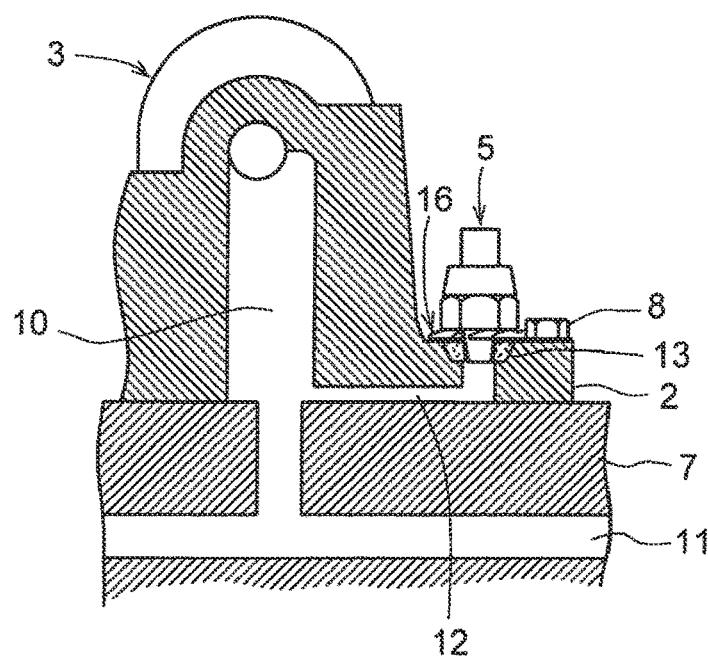

[FIG. 5]
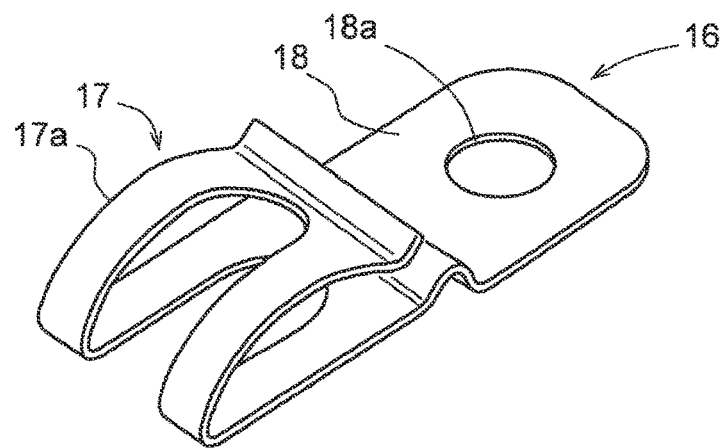
[FIG. 6]
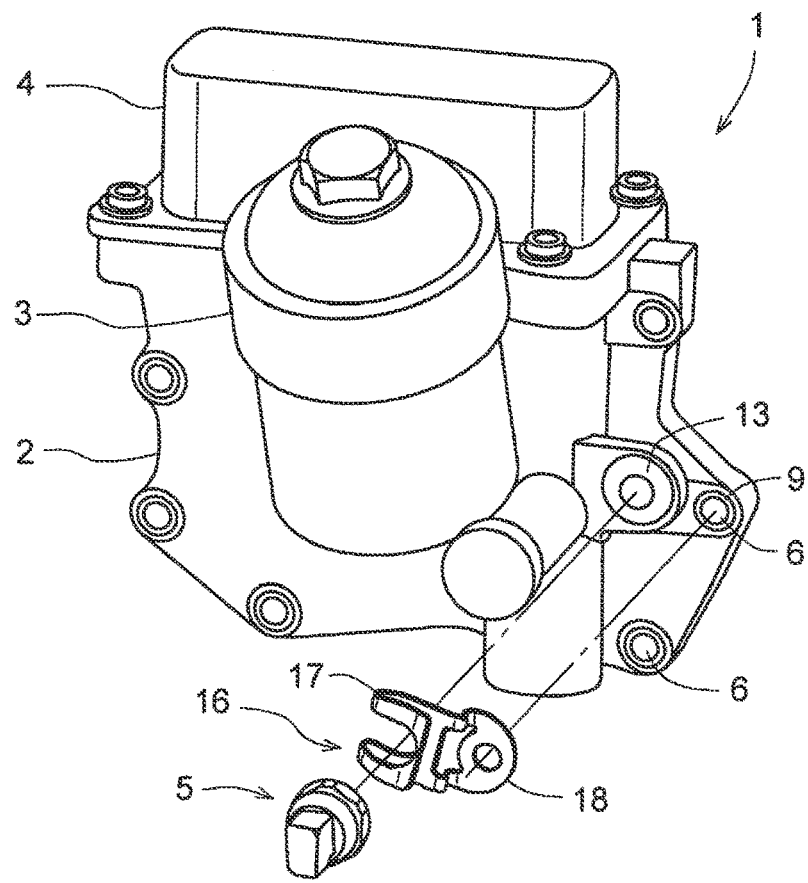

[FIG. 7]
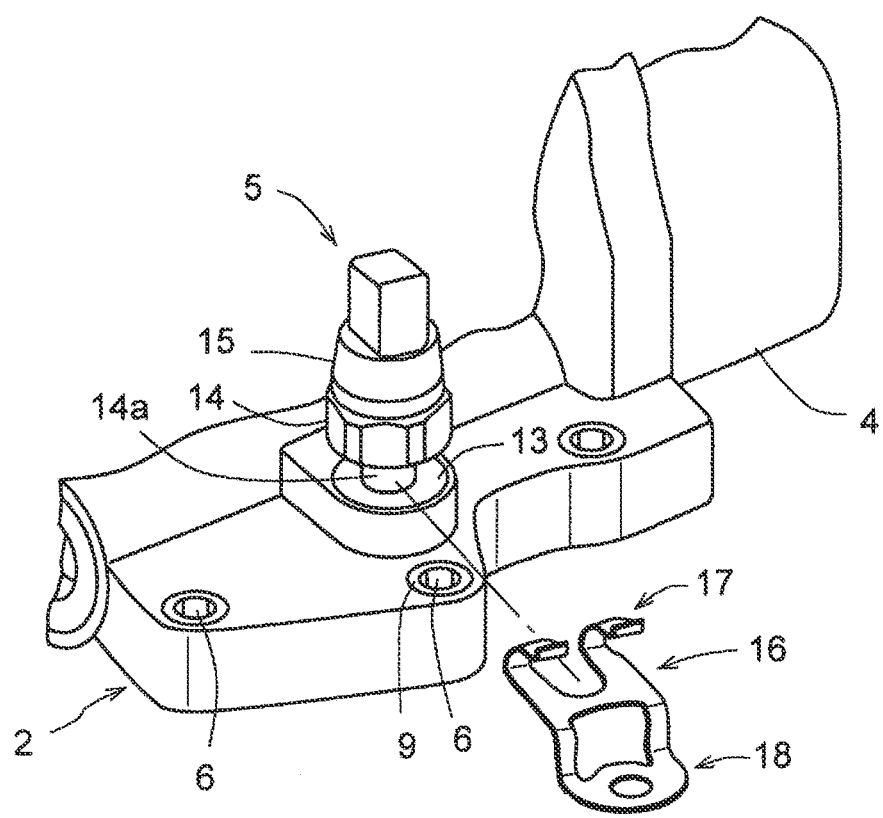

GROUNDING STRUCTURE FOR INTERNAL COMBUSTION ENGINE

CROSS-REFERENCE TO RELATED APPLICATIONS

This application is a U.S. National Stage entry of PCT Application No: PCT/JP2016/083206 filed Nov. 9, 2016, which claims priority to Japanese Patent Application No. 2015-222130, filed Nov. 12, 2015, the contents of which are incorporated herein by reference.

TECHNICAL FIELD

The present disclosure relates to a grounding structure for an internal combustion engine.

BACKGROUND ART

Conventionally, on an engine body including a cylinder block and the like, an oil pressure switch as an electric component and also an oil filter assembly are attached. The oil pressure switch is directly attached to the cylinder block and thus is body-grounded. Also, the oil filter assembly is formed by mounting a plurality of components, such as an oil filter, on a metal body.

CITATION LIST

Patent Literature

PTL 1: Japanese Patent Application Publication No. 2001-271623

SUMMARY OF INVENTION

Technical Problem

However, it is conceived that for the sake of simplification, the oil pressure switch is attached to the body of the oil filter assembly and also for the sake of weight reduction, the body is formed of resin. In this case, the oil pressure switch is not electrically connected to the cylinder block, and thus there is a possibility that the oil pressure switch cannot be body-grounded.

An object of the present disclosure is to provide a grounding structure for an internal combustion engine, in which it is possible to ground an electric component even if the electric component is attached to a resinous body.

Solution to Problem

In order to achieve the above object, the present disclosure provides a grounding structure for an internal combustion engine, including a resinous body configured to be fastened to an engine body by a bolt; an electric component attached to the body; and a conductive member electrically connecting the electric component to the bolt in order to ground the electric component to the cylinder block.

Advantageous Effects of Invention

According to the grounding structure for the internal combustion engine of the present disclosure, it is possible to ground an electric component even if the electric component is attached to a resinous body.

BRIEF DESCRIPTION OF DRAWINGS

FIG. 1 is an enlarged sectional view showing a main part of an oil filter assembly employing a grounding structure according to one embodiment of the preset disclosure.

FIG. 2 is an enlarged front view showing a main part of the oil filter assembly.

FIG. 3 is a front view showing the oil filter assembly.

FIG. 4 is a sectional view as viewed from an A-A arrow direction in FIG. 3.

FIG. 5 is a perspective view showing a conductive member.

FIG. 6 is a perspective diagram explaining positional relationships of an oil pressure switch, a body and the conductive member.

FIG. 7 is a diagram explaining a method of attaching the conductive member.

DESCRIPTION OF EMBODIMENTS

Hereinafter, preferred embodiments of the present disclosure will be described with reference to the accompanying drawings.

As shown in FIGS. 3 and 6, an oil filter assembly 1 includes a body (main body) 2 formed of resin; an oil filter 3 provided on the body 2; an oil cooler 4 provided on the body 2; and an oil pressure switch 5 as an electric component provided on the body 2.

As shown in FIGS. 1 and 6, the body 2 has a plurality of bolt holes 6 formed therein. The bolt holes 6 are intended to allow bolts 8 to be inserted therethrough for fastening the body 2 to an engine body 7 (specifically, a cylinder block) of a diesel engine, which is an internal combustion engine, and are formed plurally on an outer circumferential portion of the body 2. In the engine body 7, threaded holes 7a, in which the bolts 8 are to be screwed/fastened, are formed corresponding to locations of the bolt holes 6. When the body 2 is molded, cylindrical collars 9 are integrally provided in the body 2, so that the bolt holes 6 are formed inside the collars 9, respectively. The collars 9 are made of a conductive material, such as metal, and are formed to have the same length as a thickness of the body 2. That is, the collars 9 are configured such that one end thereof is exposed at a location flush with a surface 2a of the body 2 and also the other end is exposed at a location flush with an attaching surface 2b of the body 2. Thus, the other end of the collars 9 is configured to abut against the engine body 7. Meanwhile, if a resin material for the body 2 has a strength sufficient for tightening the bolts, the collars 9 are not necessarily required, but may be omitted.

As shown in FIG. 4, the body 2 has an oil introduction passage 10 formed to introduce an engine oil into the oil filter 3 and the oil cooler 4, and an oil return passage (not shown) formed to return the engine oil to the engine body 7. The oil introduction passage 10 is connected to an oil gallery 11 of the engine body 7, so that the engine oil is introduced from the oil gallery 11 into the oil filter 3 and the oil cooler 4. Also, in the body 2, an oil pressure introduction passage 12 for introducing an oil pressure into an oil pressure switch 5 as described below is formed to be branched from the oil introduction passage 10.

Further, as shown in FIGS. 1 and 4, the body 2 has a nut portion 13 integrally provided to allow the oil pressure switch 5 to be attached thereto. The nut portion 13 is formed as a tapered nut made of a conductive material, such as metal, and is arranged to be oriented toward the oil pressure introduction passage 12. The nut portion 13 has an opening 13a positioned inside the oil pressure introduction passage 12, so that an oil pressure can be introduced up to the oil pressure switch 5 screwed in the nut portion 13. Further, in particular, the nut portion 13 is arranged to be close to any one of the bolt holes 6 and to have a center axis parallel to an axis of the associated bolt hole 6.

The oil pressure switch 5 has a fastened body 14 to be fastened to the nut portion 13, and a sensor portion 15 provided on the fastened body 14. The fastened body 14 is made of a conductive material, such as metal. The fastened body 14 has a threaded portion 14a configured to be liquid-tightly fastened to the nut portion 13 and a conduction surface portion 14b configured to face an end surface of the nut portion 13 while being spaced therefrom in an axial direction, when the threaded portion 14a is fastened in the nut portion 13. The threaded portion 14a is formed as a tapered thread. The conduction surface portion 14b is formed in the shape of a ring expanded on an outer circumferential side of the threaded portion 14a and is formed to have substantially the same outer diameter as that of the nut portion 13. A center hole (not shown), through which the engine oil is introduced, is formed in the threaded portion 14a, so that the oil pressure can be supplied to the sensor portion 15.

Further, an engine control unit (hereinafter, ECU; not shown) is connected to the oil pressure switch 5 via a harness (not shown). The ECU is configured to turn on an oil pressure warning lamp (not shown) in response to an oil pressure detected by the oil pressure switch 5.

As shown in FIGS. 1, 2 and 5, the oil pressure switch 5 is provided with a conductive member 16 grounded to the engine body 7 via the bolt 8. Herein, the internal combustion engine is mounted on a vehicle and the engine body 7 of the internal combustion engine is electrically connected to a vehicle body of the vehicle (not shown). The vehicle body is electrically connected to a negative pole of a battery (not shown) and the oil pressure switch 5 is electrically connected and grounded to the engine body 7.

The conductive member 16 is formed as a clip formed by processing a metal plate. The conductive member 16 includes a spring portion 17 configured to be provided between the nut portion 13 and the conduction surface portion 14b so as to be compressed in the axial direction of the nut portion 13, and a fastened portion 18 configured to be fastened to the body 2 in an aligned state by the bolt 8. The fastened portion 18 is fastened to the body 2 in an aligned state using the bolt 8 and the bolt hole 6, which are closest to the oil pressure switch 5. The spring portion 17 is formed by folding back one end portion of a metal plate, which extends in one direction, at an acute angle in a plate thickness direction thereof. Also, the spring portion 17 is formed in a two-pronged shape so that the threaded portion 14a of the oil pressure switch 5 can be positioned therebetween. Further, the folded-back portion 17a of the spring portion 17 is curved such that the middle thereof in a length direction is swollen up in a curved shape, thereby allowing the spring portion 17 to be smoothly inserted between the nut portion 13 and the conduction surface portion 14b. The fastened portion 18 is formed such that an insertion hole 18a for allowing the bolt 8 to be inserted therethrough is provided in the other end portion of the metal plate. Meanwhile, although the conductive member 16 has been described as being formed by processing the metal plate, the conductive member 16 may be made of any other conductive materials. Further, the fastened portion 18 may be configured such that a U-shaped cut-out or the like for allowing the bolt 8 to be inserted therethrough is formed in the other end portion of the metal plate.

Next, the operation of the present embodiment will be described.

As shown in FIG. 7, when the conductive member 16 is attached to the oil filter assembly 1, the threaded portion 14a of the oil pressure switch 5 is first screwed into the nut portion 13 of the oil filter assembly 1, so that the oil pressure switch 5 is attached thereto. The threaded portion 14a is liquid-tightly fastened to the nut portion 13 by tightening the threaded portion 14a up to a predetermined torque. In this fastened state, the conduction surface portion 14b of the oil pressure switch 5 stops at a position spaced apart from the end surface of the nut portion 13 without abutting against the nut portion 13.

Then, the spring portion 17 of the conductive member 16 is inserted between the nut portion 13 and the conduction surface portion 14b. Since the spring portion 17 is formed such that a distal end side thereof is divided into two prongs and also is formed by folding back the metal plate at an acute angle, the spring portion 17 can be easily inserted into a correct position. Therefore, the spring portion 17 is compressed while being in surface contact with the end surface of the nut portion 13 and the conduction surface portion 14b at locations on both sides of the threaded portion 14a.

Subsequently, the insertion hole 18a of the fastened portion 18 is aligned with a position of the bolt hole 6 of the body 2 and then the bolt 8 is inserted through the insertion hole 18a and the bolt hole 6 so as to be screwed into the threaded hole 7a of the engine body 7.

As a result, the oil pressure switch 5 can be grounded to the engine body 7 via the conductive member 16, the bolt 8 and the collar 9. Also, an oil pressure can be detected using the oil pressure switch 5.

Further, when the oil pressure switch 5 is removed from the oil filter assembly 1 for maintenance and the like, the conductive member 16 does not interfere with the work, since the conductive member 16 is fixed to the body 2 at a location which is located toward the body 2 rather than the oil pressure switch 5. Therefore, the oil pressure switch 5 can be simply removed.

As described above, the conductive member 16 is provided to electrically connect the oil pressure switch 5 to the bolt 8 in order to ground the oil pressure switch 5 to the engine body 7. Therefore, the oil pressure switch 5 can be electrically grounded (earthed), even if the body 2 of the oil filter assembly 1 is made of resin.

Also, the conductive member 16 has the spring portion 17 configured to be provided in a compressed state between the body 2 and the conduction surface portion 14b. Therefore, the oil pressure switch 5 and the conductive member 16 can be easily and reliably connected to each other.

Further, the spring portion 17 is formed by folding back one end portion of the metal plate extending in one direction. Therefore, the conductive member 16 can be manufactured at a low cost with a simple structure.

The spring portion 17 is formed in a two-pronged shape so that the threaded portion 14a can be positioned therebetween. Therefore, the spring portion 17 can be mounted between the nut portion 13 and the oil pressure switch 5 only by inserting the spring portion 17 therebetween after the nut portion 13 is attached to the oil pressure switch 5. As a result, it is possible to reliably electrically connect the nut portion 13 with the conductive member 16 by a simple work.

The conductive member 16 has the fastened portion 18 configured to be fastened to the body 2 in an aligned state by the bolt 8. Therefore, the conductive member 16 can be reliably electrically connected to the bolt 8 with a simple structure. Also, even when the oil pressure switch 5 has been removed from the body 2, the conductive member 16 can be maintained fixed on the body 2, thereby facilitating maintenance of the oil pressure switch 5.

Meanwhile, although the case where the oil pressure switch 5 is provided on the resinous body 2 of the oil filter assembly 1 has been described in the foregoing embodiments, the preset disclosure is not limited thereto. The electric component may be any component other than the oil pressure switch 5, and also the body may not be the body 2 of the oil filter assembly 1. Likewise, the assembly may be any assembly other than the oil filter assembly.

Also, the resinous body 2 may be provided on any other engine structural parts of the engine body 7. As used herein, the term "engine structural part" refers to an engine structural part, such as a cylinder block, a crankcase and a cylinder head, and also means a body-grounded part made of a conductive material.

Also, although the nut portion 13 has been described as being connected to the oil pressure introduction passage 12, the nut portion 13 may be directly connected to the oil introduction passage 10 as long as a flow of the engine oil is not obstructed.

Although the engine body 7 has been described as a diesel engine, the engine body 7 may be any other internal combustion engines, such as a gasoline engine.

This application is based on Japanese Patent Application No. 2015-222130 filed on Nov. 12, 2015, the entire contents of which are incorporated herein by reference.

INDUSTRIAL APPLICABILITY

The present invention has the effect that it is possible to ground an electric component even if the electric component is attached to a resinous body, and thus is useful for a grounding structure for an internal combustion engine and the like.

REFERENCE SIGNS LIST

2: Body
5: Oil pressure switch (electric component)
7: Engine body
8: Bolt
16: Conductive member

The invention claimed is:

1. A grounding structure for an internal combustion engine, comprising:
   a resinous body configured to be fastened to an engine body by a bolt;
   an electric component attached to the body; and
   a conductive member electrically connecting the electric component to the bolt in order to ground the electric component to the engine body,
   wherein the electric component has a conduction surface portion configured to face the body while being spaced therefrom when the electric component is attached to the body, and
   wherein the conductive member has a spring portion configured to be provided in a compressed state between the body and the conduction surface portion.

2. The grounding structure according to claim 1, wherein the electric component is an oil pressure switch configured to detect an oil pressure of an oil passage formed in the body.

3. The grounding structure according to claim 1, wherein the spring portion is formed by folding back one end portion of a metal plate extending in one direction.

4. The grounding structure according to claim 1,
   wherein the body has a nut portion,
   wherein the electric component has a threaded portion to be fastened to the nut portion, and
   wherein the spring portion is formed in a two-pronged shape to position the threaded portion therebetween.

5. The grounding structure according to claim 1, wherein the conductive member has a fastened portion configured to be fastened to the body in an aligned state by the bolt.

6. The grounding structure according to claim 1,
   wherein the electric component comprises:
      a threaded portion; and
      a conduction surface portion configured to face the body while being spaced therefrom when the electric component is attached to the body,
   wherein the body comprises:
      a bolt hole configured to allow the bolt to be fastened therein; and
      a nut portion formed at a location spaced apart from the bolt hole, the threaded portion being screwed in the nut portion,
   wherein the conductive member comprises:
      a spring portion having a cut-out portion and formed by folding back one end portion of the conductive member; and
      a fastened portion having an insertion portion on the other end portion of the conductive member, the bolt being inserted through the insertion portion,
   wherein the spring portion is configured to be provided in a compressed state between the body and the conduction surface portion in a state where the threaded portion is inserted through the cut-out portion, so that the spring portion is electrically connected to the conduction surface portion, and
   wherein the fastened portion is electrically connected to the engine body via the bolt by the bolt being inserted through the insertion portion and the bolt hole and being fastened to the engine body.

7. The grounding structure according to claim 6, wherein the nut portion is provided at a location spaced radially apart from the bolt hole.

8. The grounding structure according to claim 6, wherein the nut portion has a center axis substantially parallel to an axis of the bolt hole.

* * * * *